July 5, 1966  T. F. GRIFFETH  3,259,202
MERCURY SWITCH SYSTEM FOR AUTOMOTIVE IGNITION CUT-OFF
Filed Aug. 27, 1963  3 Sheets-Sheet 1
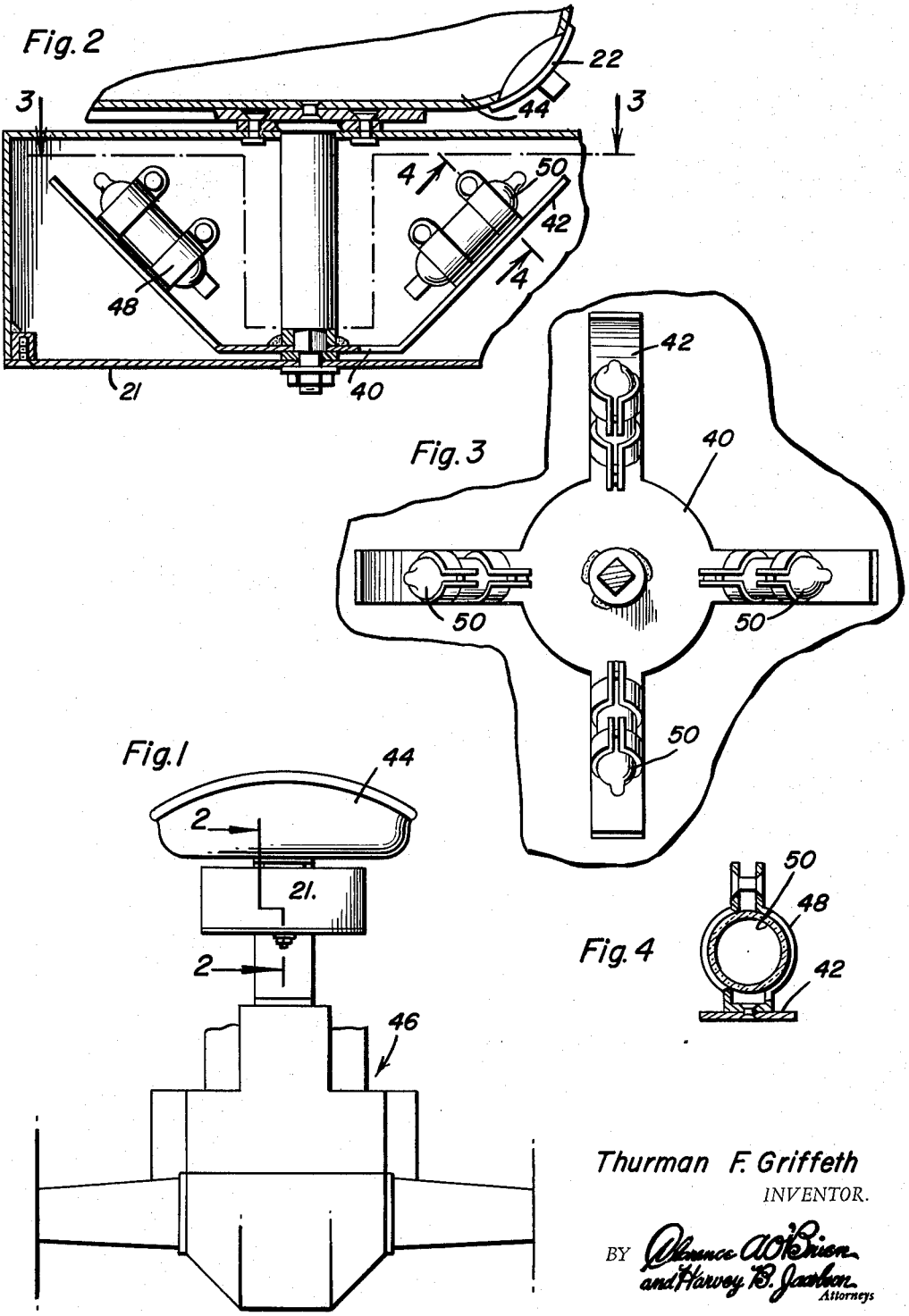
Thurman F. Griffeth
INVENTOR.

July 5, 1966  T. F. GRIFFETH  3,259,202
MERCURY SWITCH SYSTEM FOR AUTOMOTIVE IGNITION CUT-OFF
Filed Aug. 27, 1963  3 Sheets-Sheet 2
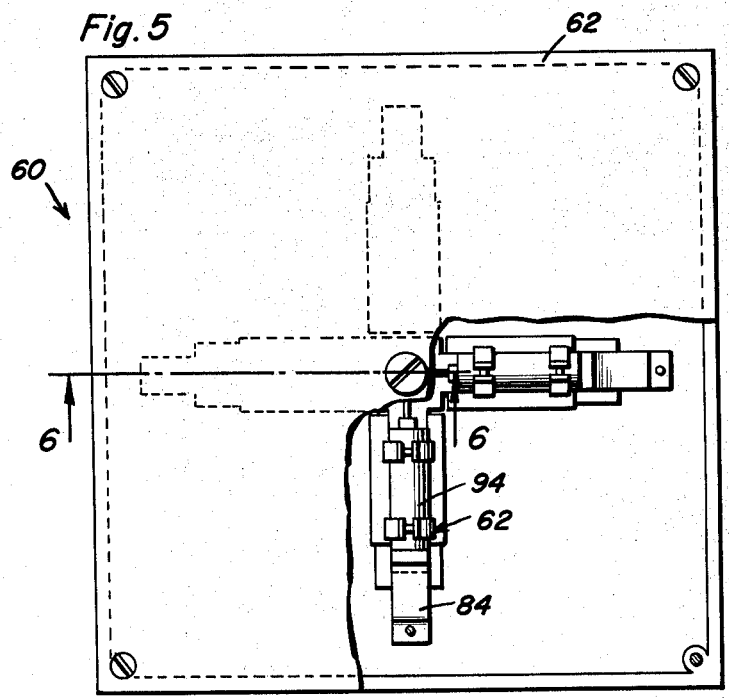
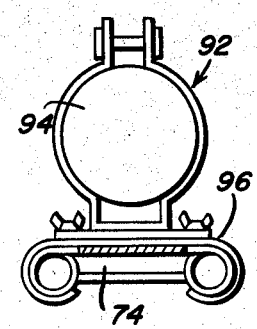
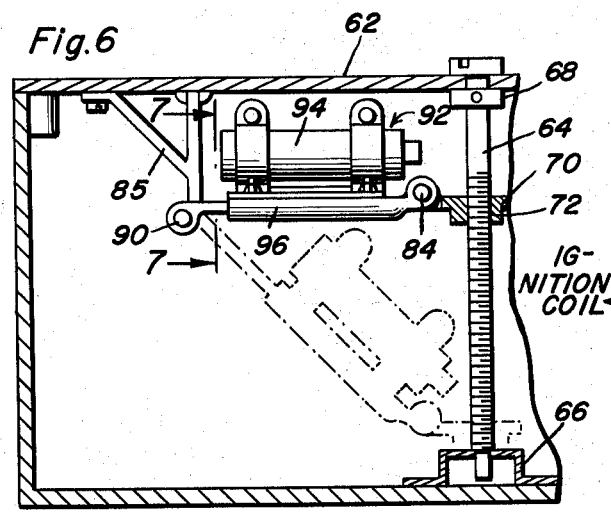
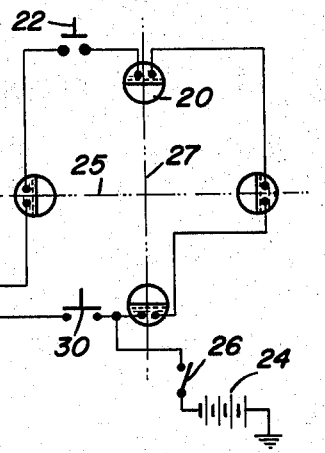
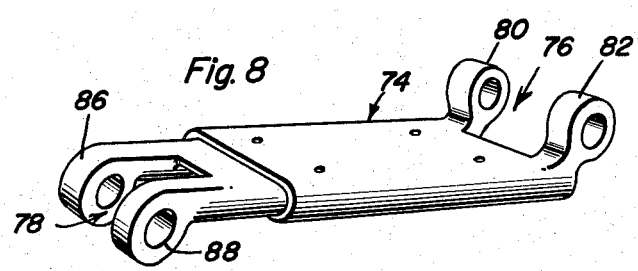
Thurman F. Griffeth
INVENTOR.
BY *Clarence A. O'Brien*
and *Harvey B. Jacobson*
Attorneys July 5, 1966 T. F. GRIFFETH 3,259,202
MERCURY SWITCH SYSTEM FOR AUTOMOTIVE IGNITION CUT-OFF
Filed Aug. 27, 1963 3 Sheets-Sheet 3

Thurman F. Griffeth
INVENTOR.

United States Patent Office 3,259,202
Patented July 5, 1966

3,259,202
MERCURY SWITCH SYSTEM FOR AUTOMOTIVE
IGNITION CUT-OFF
Thurman F. Griffeth, Weston, Idaho
(% Cache Valley Enterprises, Inc., Preston, Idaho)
Filed Aug. 27, 1963, Ser. No. 304,847
13 Claims. (Cl. 180—82)

This invention primarily relates to an improved device for use with earth-working vehicles or the like for automatically shutting off the ignition system or throttle control of an engine or to temporarily interrupt the operation of the engine in order to control the speed thereof when the vehicle tilts to an angle or encounters any sudden shock.

It is therefore the primary object of this invention to stop or control the speed of a vehicle at any time it attains a precarious operating position.

A further object of this invention resides in the provision of means which can be used to adjust the sensitivity of the speed regulating or motor cut-off device.

Yet another object of this invention resides in the provision of a device of the character indicated which may be used on vehicles having different varieties of electrical systems, including diesel engine, battery and magneto ignitions.

These together with other objects and advantages which will become subsequently apparent reside in the details of construction and operation as more fully hereinafter described and claimed, reference being had to the accompanying drawings froming a part thereof, wherein like numerals refer to like parts throughout, and in which:

FIGURE 1 is a rear view in elevation of the device comprising the subject matter of the instant invention mounted beneath a tractor seat.

FIGURE 2 is a fragmentary sectional view taken substantially along the plane indicated by the line 2—2 of FIGURE 1.

FIGURE 3 is a sectional view taken substantially along the plane indicated by the line 3—3 of FIGURE 2.

FIGURE 4 is a sectional view taken substantially along the plane of the line 4—4 of FIGURE 2.

FIGURE 5 is a top plan view with certain portions thereof broken away for clarity of an alternative embodiment of the invention disclosing a unit wherein the sensitivity of the device may be readily adjusted.

FIGURE 6 is a fragmentary sectional view taken substantially along the plane indicated by the line 6—6 of FIGURE 5.

FIGURE 7 is a sectional view taken substantially along the plane indicated by the line 7—7 of FIGURE 6.

FIGURE 8 is a perspective view of a mounting bracket utilized in the embodiment of the invention shown in FIGURE 5.

FIGURE 10 is a schematic representation of the electrical circuit using the principles of the instant invention in a battery ignition system.

Figure 9:
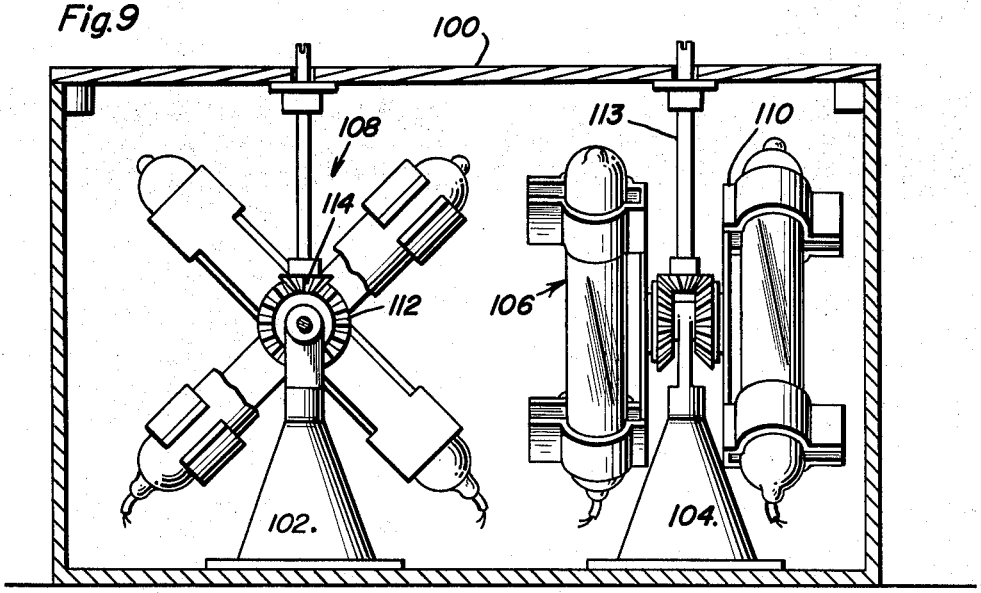
FIGURE 9 is a sectional view through still another alternative embodiment of the device embodying the concepts of the instant invention and more particularly is directed to a different sensitivity adjustment arrangement.

Referring now to the drawings in detail, it will subsequently become apparent that if any violent shock is imparted to an earth-working vehicle on which the device of the instant invention is mounted, or if the vehicle negotiates a sharp curve or if the vehicle completely loses balance and turns over, the prime moving force of the vehical is adapted to be shut-off or at least the speed of the vehicle is adapted to be governed. To carry out these principles, a cluster of four mercury switches, each one of which is designated by the numeral 20, are mounted on the vehicle within a suitable housing 21 in oppositely facing pairs whereby any undue shock transmitted to the vehicle or undue pivotal motion of the vehicle about its transverse axis or about its longitudinal axis will cause at least one switch of one pair of said switches to be open while the other switch of said pair is closed. When this happens, the prime mover of the vehicle will either be stopped or temporarily interrupted. Furthermore, if the vehicle completely turns over, all the switches are adapted either to open or close, as will subsequently be pointed out, to stop the prime mover completely.

Referring now to FIGURE 10, it will be seen that the cluster of mercury switches 20 are arranged in series with each other and are normally closed. A normally open seat switch 22 is also arranged in series with the mercury switches 20 whereby the device cannot be rendered operative unless the operator of the vehicle is seated. When he is seated on the vehicle, the switch 22 closes the circuit. The vehicle battery 24 and ignition switch 26 are also connected in series with each of the mercury switches 20. Normally, upon the operator being seated on the vehicle seat to close the switch 22, and the ignition switch 26 being closed, a circuit will be established from the vehicle battery 24 through each of the switches 20 and to the ignition coil of the vehicle whereby the engine may be actuated and kept running. However, if the vehicle pitches forward about its transverse axis 25, or the vehicle is jarred by encountering an obstruction in its path, the inertia of the liquid mercury pool in the forwardmost mercury switch will cause it to remain closed while the inertia of the liquid mercury pool in the rearmost switch will cause it to open. This will open the circuit to the ignition coil and momentarily interrupt the operation of the engine, until the vehicle rights itself whereupon the engine once again will assume operation. If the shock imparted to the vehicle is violent enough, or if the operator is catapulted from the seat, the engine will be completely stopped thereby avoiding a possible serious accident. As will be apparent if the vehicle tilts rearwardly about the axis 25 the rearmost switch 20 will be opened as the mercury pool is displaced. If the vehicle tilts forwardly about the axis 25 the circuit will also once again be interrupted due to the opening of the forwardmost mercury switch. This result will also be obtained if the vehicle tilts to either side about longitudinal axis 27 of the vehicle. This last condition will usually occur when the vehicle is taken around a curve or makes a sharp turn whereby the liquid mercury pools in the side switches are both thrown towards one side of the axis in their respective tubes by centrifugal force. In this instance the device acts as a speed governor inasmuch as the engine is temporarily shutdown. If the operator is in need of power to negotiate the curve or turn, he may simply depress a by-pass switch such as 30 to once again actuate the ignition coil from the battery 24 and have the engine at his control. Due to the orientation of the mercury switch tubes on the vehicle, as will subsequently be described, if the vehicle completely turns over or loses its balance, all of said switches will open to shut down the engine completely.

Figure 11:
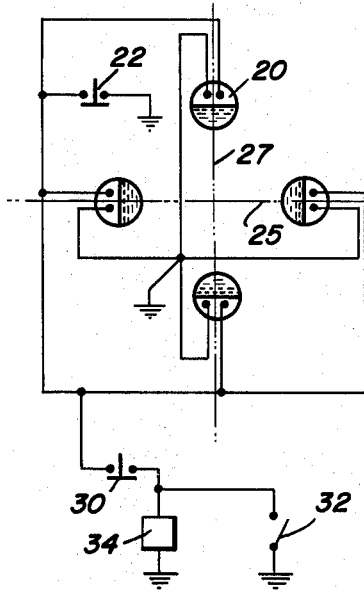
FIGURE 11 is a schematic representation of an electrical circuit using the principles of the instant invention in a magneto ignition system.

Referring now to FIGURE 11, the engine shut-down is adapted to be used with magneto ignition systems. In this arrangement, the seat switch 22 is normally closed and is opened by the weight of the operator upon the seat. The magneto 34 is connected through the normally closed by-pass switch 30 to the mercury switches 20 and the seat switch 22. Upon opening of the ignition switch 32, the magneto will be rendered operative thereby enabling the engine of the device to be started. The mercury switches are normally open in this embodiment, which is accomplished by merely reversing the mercury tubes in their holding brackets from the use of these tubes described in conjunction with the circuit of FIGURE 10. It will be seen that the seat switch 22, and each of the mercury switches 20 are connected in parallel with the magneto whereby if the seat switch 22 is closed by the operator leaving the seat or if any of the mercury switches 20 are closed, the magneto will be shorted out thereby interrupting the operation of the engine. Again, this will occur, due to any undue movement about either the transverse axis 25 or the longitudinal axis 27 of the vehicle. Closing the ignition switch 32 will also short out the magneto to shut-down the engine. However, if the vehicle operator needs power and any of the mercury switches 20 or seat switch 22 is closed, the operator need only open the by-pass switch 30 to render the magneto 34 functional inasmuch as the grounding portion of the circuit will be disconnected from the magneto.

Figure 12:
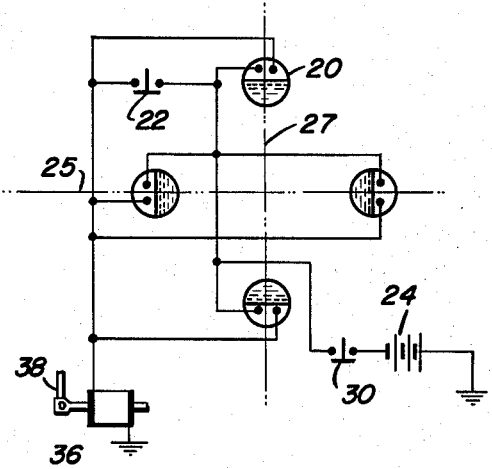
FIGURE 12 is a schematic representation of an electrical circuit using the principles of the instant invention with a diesel engine.

Referring now to the circuit shown in FIGURE 12, the operation of a diesel engine or any throttle controlled engine may be controlled by the mercury switch arrangement used in the present invention. This arrangement is also provided with a normally closed seat switch 22 adapted to be opened by the operator's weight upon the seat. With the operator in this position and each of the mercury switches 20 normally open, a solenoid 36 will not be actuated to pull a connecting link 38 of the throttle of the engine. However, if any one of the mercury switches is closed because of movement about either of the axes 25 or 27 or by the operator leaving his seat, the solenoid 36 will be connected to the battery 24 to pull the connecting link 38 to close the engine throttle, to temporarily interrupt or shut-off the diesel engine. With the battery 24 disconnected from the solenoid 36, normal manual operation of the throttle will be permitted to thereby effectively control the running of the engine in any manner desired. A by-pass switch 30 is also connected between the battery 24 and the solenoid 36 whereby if the throttle is closed by the circuit, the switch may be depressed to disconnect the battery from the solenoid 36 and once again permit manual control of the throttle when necessary.

To carry out the principles previously enumerated, a spider comprising a base 40 and four angularly oriented arms 42 with respect to the base 40 is suspended beneath the seat 44 of a tractor vehicle or the like 46. Each pair of oppositely facing arms 42 extend along either the transverse or longitudinal axis of the vehicle. Mounted on each of the arms 42 is a clamp such as 48 which retains a mercury tube such as 50 on the spider. Due to the angular orientation of the mercury tubes 50 on the arms 42, the mercury within the tubes is adapted to slide to one end of the tubes. If the circuit of FIGURE 10 is being employed, the contact probes extending into the mercury pool within each of the tubes will extend from the lowermost portion of the tubes. On the other hand, if the circuit arrangements depicted in FIGURES 11 and 12 are to be employed, the mercury tubes will be reversed in the clamps 48 whereby the probes will ordinarily not enter the mercury pools within the tubes. The seat switch may be arranged in any conventional manner desired. The sensitivity of the device is of course controlled by the angular orientation of the spider arms 42 with respect to the horizontal. To vary this angular orientation, the devices depicted in FIGURES 5 and 9 may be employed.

Referring to FIGURES 5–8, the adjustable unit shown is generally designated by the numeral 60 and comprises a housing 62 in which a threaded actuating member 64 is mounted. The threaded member 64 is held in fixed rotatable position by means of a bracket 66 mounted within the housing through which the threaded member 64 is rotatably positioned and held against vertical movement by means of a retaining washer such as 68 keyed to the member 64. A center plate 70, having a threaded bore 72 therethrough is mounted on the actuating member 64 for vertical movement with respect thereto. Four brackets 74, comprising bifurcated ends 76 and 78 are pivotally mounted in opposed relation on the center plate 70. As should be apparent, a portion of the center plate 70 extends between the furcations 80 and 82 and a hinge pin 84 pivotally locks the parts together. The bifurcated end 78 of the bracket 74 is pivotally mounted upon a bracket 85 attached to the top wall of the housing 62. As shown, a portion of the bracket 85 extends between the furcations 86 and 88 of the bifurcated end 78 of the bracket 74 and the parts are pivotally locked together by means of a hinge pin such as 90. Each one of the brackets 74 mounts a clamp member 92, similar to the clamps 48 for holding one of the mercury tubes 94. Thus it will be appreciated, that by turning the actuating member 64, the angular relation of the mercury tube 94 with respect to the housing may be varied by moving the center plate 70 up or down on the actuating member 64. The angular orientation of the mercury tube 94 will determine the sensitivity of the device, that is the amount of vibration or movement or tilt which must be imparted to the vehicle in order to break or make contact with the mercury pool within the tube 94. As in the first embodiment of the invention, the tubes 94 may be reversed within the clamp 92 for use with the various ignition systems already disclosed. It should also be noted, that if desired the clamps 92 may be mounted upon a telescoping base such as 96 which is received upon the bracket 74 thereby providing a sliding adjustment for positioning the tubes. Of course, in order to effect the aforementioned adjustment, the end 78 of the bracket 74 is also telescopically received within the end portions 76 of the bracket whereby the length of the bracket may be varied.

FIGURE 9 shows still another alternative arrangement for varying the angular orientation of the pairs of mercury tubes. In this arrangement, it will be apparent that the sensitivity of the device may be controlled about either the transverse or the longitudinal axis of the vehicle independent of each other. For accomplishing this purpose, the housing 100 has a pair of standards 102 and 104 mounted therein. The standards 102 and 104 are disposed so as to be displaced 90° from each other and each rotatably mounts a pair of mercury tubes such as 106 and 108. These tubes, are carried by brackets or clamps 110, each of which has an integral beveled gear 112 extending from one side thereof. Each of the beveled gears 112 is journaled on the appropriate standard 102 or 104. An actuating rod 113 for each pair of tubes extends through the top of the housing 100 and has mounted on one end thereof a beveled gear 114 which is disposed in mating engagement with each of the beveled gears 112 carried by the tube clamps or brackets. It should thus be apparent that upon rotation of the actuating rod 113, each of the tubes in each pair may be simultaneously angularly adjusted in opposite directions from each other. Because of the 90° displacement of each pair of tubes, independent adjustment for sensitivity about the longitudinal or transverse axis of the vehicle may be obtained. Of course, the tubes are used in the same manner as described in FIGURES 10–12.

While operation of the device has been described using mercury liquid as the conducting fluid in each of the switches, it should be apparent that the device may be made operative with any conducting or semi-conducting fluid, having the proper consistency, coherence, specific gravity, and conductance for the purposes desired. For example, a substance such as conductive granules or powders may be used whose conductivity can be changed by such factors as centrifugal force, inertia, gravity, etc., whereby the current intensity may be varied so as to control the force on a throttle. Also, while in order to have the device operative, there must be a cluster of at least four opposing switches as described, it will also be apparent that any number of pairs above four may be utilized to increase the sensitivity of the device. Furthermore, while the device has been specifically described as an ignition cut-off system, it may be used as a leveling device for a combine harvester, for example. In such an application, the switches would be designed to dampen the action of the mercury within each of the tubes by means of baffles or deterrent openings between the electrode or probe end of the tube and the end carrying the mercury pool. This will cause the switches to make and break contact more slowly whereby only a reasonably sustained tilt can actuate a suitable hydraulic leveling system or the like whereby the combine traveling over holes or the like will have no effect. The device is also capable of being used as a brake control for an electrically controlled braking system of a vehicle. Other practical applications of the device could include its use as a sensing unit on automatic land leveling devices. It should also be appreciated that the device need not be mounted at the exact intersecion of the transverse and longitudinal axes of the vehicle but may be so adjusted to be effective on any pair of axes parallel to the two aforementioned axes. If desired, a unit could be mounted on the vehicle to act only when the vehicle overturns to actuate an injection system which will inject a suitable chemical into a fuel tank which will cause the fuel to jell thus retarding its fluidity and to prevent it from burning or exploding.

To summarize the operation of the device, it should now be understood that if the vehicle on which the device is mounted encounters any violent shocks causing it to momentarily halt or to pitch forward or rearwardly, the engine or prime mover of the device will be automatically interrupted by a make or break contract in either one of the forward or rearmost mercury tubes, which may be employed in any one of the three ignition system disclosed. Similarly, if the vehicle rounds a curve or makes a turn at too great a speed, one of the side switches will either be actuated or deactuated as the case may be. If the vehicle turns completely over or loses its valance, all of the switches will either be connected or disconnected from the circuit dependent upon the orientation of the tubes in their holding means and due to the angular orientation thereof. Manually actuated by-pass switches are provided in each of the ignition systems whereby the operator of the vehicle has complete independent control of the machine at all times. Also, the sensitivity of the device may be controlled by the operator dependent upon the use of the vehicle.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a device for controlling the speed of a moving vehicle, at least four mercury switches arranged in opposing pairs, each of said switches being supported on the vehicle at an angle with respect to the horizontal, one switch of each pair being oppositely oriented with respect to the other switch, electrical circuit means operatively connecting each of said switches to means controlling actuation of the prime mover of the vehicle for interrupting its operation upon a sensing by said switches of any undue shock, tilt, pivotal motion or excessive speed of the vehicle, the switches being supported in a housing mounted on the vehicle, each pair of said switches being separately supported in a relative orientation displaced 90° from each other, and rotatable means carried by the housing for simultaneously tilting at least one pair of said switches in opposite directions.

2. The device of claim 1 wherein said switches are normally closed, said electric circuit means including a battery and ignition switch electrically connected in series with each of said mercury switches, an ignition coil electrically connected in series with said mercury switches for actuating the prime mover, any undue shock, tilt, pivotal motion or excessive speed of the vehicle opening at least one of said switches to deenergize said coil by disconnecting it from the battery to interrupt the operation of the prime mover.

3. The device of claim 1 wherein all of said mercury switches are normally open and electrically connected in parallel, said electric circuit means including a magneto electrically connected in parallel with all of said switches for actuating said prime mover, a starting switch for connecting said magneto to the prime mover, closing of at least one of said mercury switches by the sensing of any undue shock, tilt, pivotal motion or excessive speed of the vehicle shorting out said magneto to interrupt the operation of the prime mover.

4. The device of claim 1 wherein all of said switches are normally open, said electric circuit means including a battery and a solenoid for controlling the throttle of a diesel engine, said battery being electrically connected to said solenoid through any one of said switches when closed for actuating said solenoid to close said throttle.

5. The device of claim 1 including means carried by the housing for simultaneously rotating a first pair of said switches in opposite directions, and means carried by the housing for simultaneously rotating the other pair of said switches in opposite directions.

6. The device of claim 5 wherein said switches are normally closed, said electric circuit means including a battery and ignition switch electrically connected in series with each of said mercury switches, an ignition coil electrically connected in series with said mercury switches for actuating the prime mover, any undue shock, tilt, pivotal motion or excessive speed of the vehicle opening at least one of said switches to deenergize said coil by disconnecting it from the battery to interrupt the operation of the prime mover.

7. The device of claim 5 wherein all of said mercury switches are normally open and electrically connected in parallel, said electric circuit means including a magneto electrically connected in parallel with all of said switches for actuating said prime mover, a starting switch for connecting said magneto to the prime mover, closing of at least one of said mercury switches by the sensing of any undue shock, tilt, pivotal motion or excessive speed of the vehicle shorting out said magneto to interrupt the operation of the prime mover.

8. The device of claim 5 wherein all of said switches are normally open, said electric circuit means including a battery and a solenoid for controlling the throttle of a diesel engine, said battery being electrically connected to said solenoid through any one of said switches when closed for actuating said solenoid to close said throttle.

9. In a device for controlling the speed of a moving vehicle, at least four mercury switches arranged in opposing pairs, each of said switches being supported on the vehicle at an angle with respect to the horizontal, one switch of each pair being oppositely oriented with respect to the other switch, electrical circuit means operatively connecting each of said switches to means controlling actuation of the prime mover of the vehicle for interrupting its operation upon a sensing by said switches of any undue shock, tilt, pivotal motion or excessive speed of the vehicle, the switches being supported in a housing mounted on the vehicle, and rotatable means carried by the housing for simultaneously tilting each pair of said switches in opposite direction.

10. The device of claim 9 wherein each of said four mercury switches is mounted on a swingable bracket, each of said brackets being mounted at one end for rotation and at the other end thereof on said rotatable means.

11. The device of claim 10 wherein said switches are normally closed, said electric circuit means including a battery and ignition switch electrically connected in series with each of said mercury switches, an ignition coil electrically connected in series with said mercury switches for actuating the prime mover, any undue shock, tilt, pivotal motion or excessive speed of the vehicle opening at least one of said switches to deenergize said coil by disconnecting it from the battery to interrupt the operation of the prime mover.

12. The device of claim 10 wherein all of said mercury switches are normally open and electrically connected in parallel, said electric circuit means including a magneto electrically connected in parallel with all of said switches for actuating said prime mover, a starting switch for connecting said magneto to the prime mover, closing of at least one of said mercury switches by the sensing of any undue shock, tilt, pivotal motion or excessive speed of the vehicle shorting out said magneto to interrupt the operation of the prime mover.

13. The device of claim 10 wherein all of said switches are normally open, said electric circuit means including a battery and a solenoid for controlling the throttle of a diesel engine, said battery being electrically connected to said solenoid through any one of said switches when closed for actuating said solenoid to close said throttle.

References Cited by the Examiner

UNITED STATES PATENTS

| | | | |
|---|---|---|---|
| 2,250,754 | 7/1941 | Dooley | 180—82 |
| 2,296,053 | 9/1942 | Porter et al. | 200—61.52 |
| 2,757,749 | 8/1956 | Cooper et al. | 180—82 |
| 2,782,276 | 2/1957 | Woods. | |

FOREIGN PATENTS

| | | |
|---|---|---|
| 81,994 | 10/1956 | Denmark. |
| 1,281,558 | 12/1961 | France. |

BENJAMIN HERSH, *Primary Examiner.*

E. E. PORTER, *Assistant Examiner.*